Sept. 5, 1950          I. W. DOYLE          2,521,153
CAMERA WITH DELAYED SHUTTER ACTION
Filed Dec. 20, 1945          2 Sheets—Sheet 1
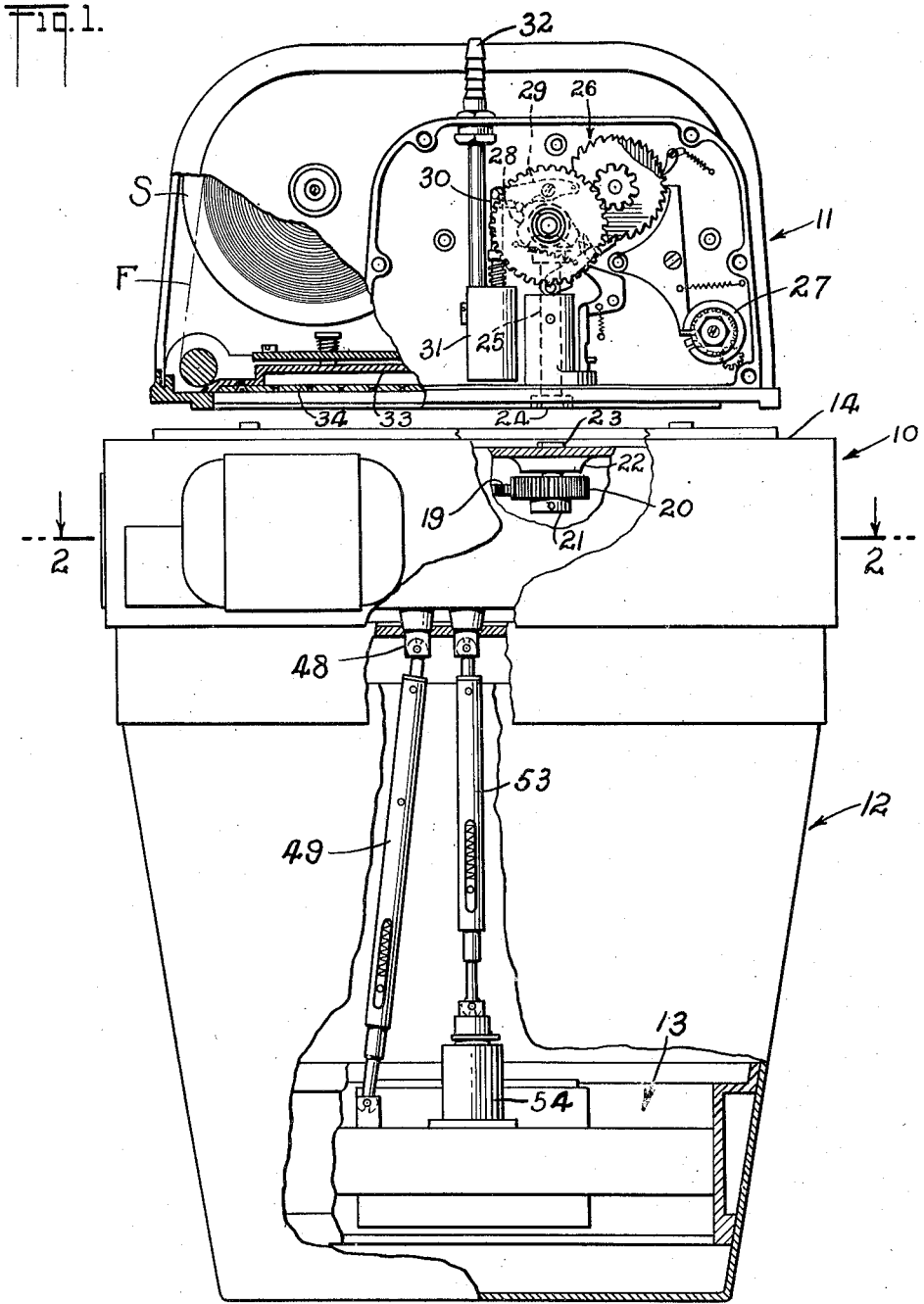
INVENTOR.
Irving W. Doyle
BY
Blair, Curtis & Hayward
ATTORNEYS Sept. 5, 1950        I. W. DOYLE        2,521,153
CAMERA WITH DELAYED SHUTTER ACTION
Filed Dec. 20, 1945        2 Sheets-Sheet 2
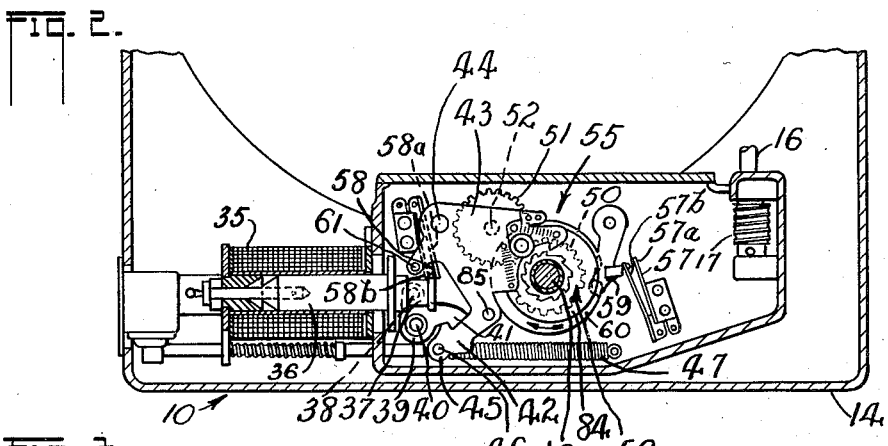
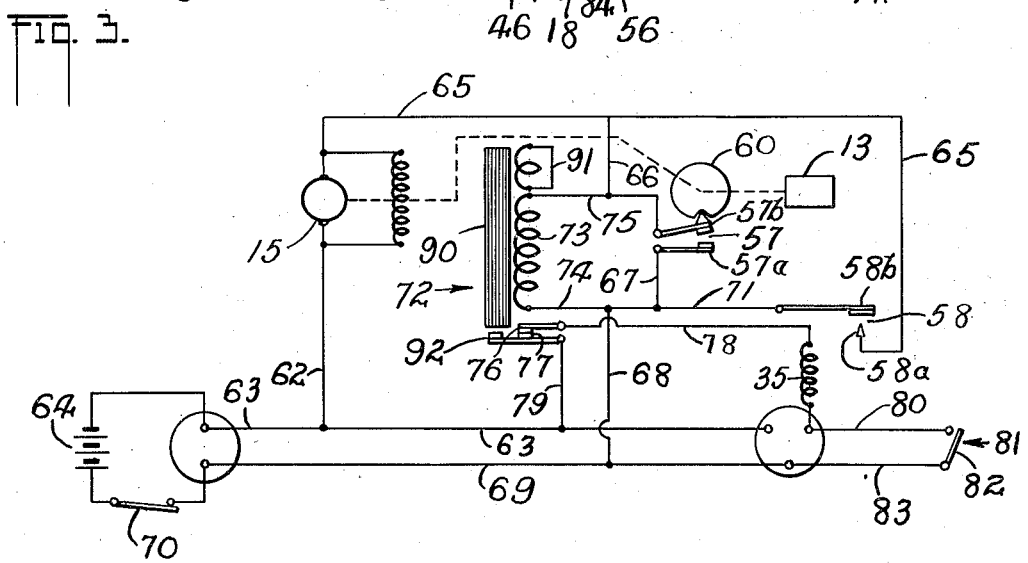
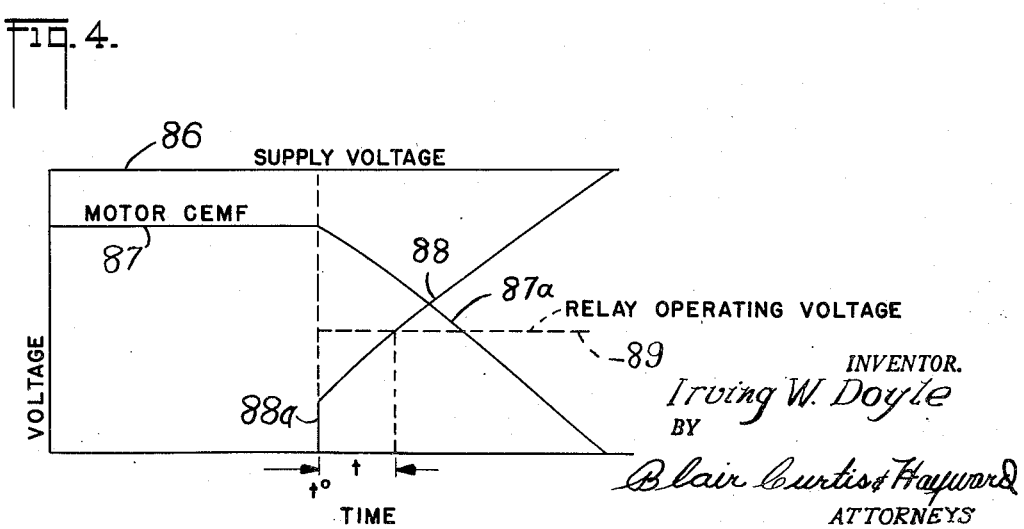
INVENTOR.
Irving W. Doyle
BY
Blair Curtis & Hayward
ATTORNEYS Patented Sept. 5, 1950

2,521,153

UNITED STATES PATENT OFFICE 2,521,153

CAMERA WITH DELAYED SHUTTER ACTION

Irving W. Doyle, Massapequa, N. Y., assignor to Fairchild Camera and Instrument Corporation, Jamaica, N. Y., a corporation of Delaware Application December 20, 1945, Serial No. 636,164

7 Claims. (Cl. 88—16)

This invention relates to cameras, and more particularly to means in an automatic aerial camera for delaying tripping operation of the shutter when the camera is operated in run away fashion, i. e. is continuously making successive exposures over a period of time.

Certain types of special purpose cameras, such as, for example, aerial cameras, are so designed as to be capable of automatically making successive exposures continuously over a period of time. Such cameras carry a substantial length of strip film, which is automatically fed from a supply to a take-up spool between exposures, to properly position unexposed film prior to the next succeeding shutter operation. More is necessary, however, particularly where high precision photographs are prerequisite as, for example, in high altitude mapping missions, and accordingly many of these cameras are provided with some means for flattening the film in the focal plane prior to and during the shutter operation, so that when the film is exposed it is perfectly flat.

This results in an ultimate photograph of extremely high precision with no distortion by reason of the film's being buckled in any portion thereof during exposure.

When there is a substantial interval of time between successive exposures as, for example, where it is not necessary to provide any substantial amount of overlap between successive exposures, the film flattening means, for example a vacuum system which draws the film flat into the focal plane, has sufficient time to completely flatten the film before the shutter is tripped. Where, however, a substantial amount of overlap is desired, it is necessary to operate the camera in so-called run away fashion, i. e. the operating switch of the camera is held closed so that each operative cycle starts at substantially the time the preceding one ends. Under such circumstances, it often occurs that the film flattening means has insufficient time within which to completely flatten the film prior to the shutter's being tripped, and accordingly a distorted photograph results.

It is accordingly among the objects of my invention to provide an automatic camera whereby the above disadvantages are obviated in a simple, practical and expeditious manner. Other objects will be in part apparent and in part pointed out hereinafter.

In accordance with one form of my invention, the camera includes as three main elements a magazine, a drive mechanism, hereinafter referred to as a case drive, and a shutter, illustratively a between-the-lens shutter conventionally mounted in a cone and operatively connected to the case drive. The magazine includes supply and take-up spools for the strip film, together with conventional film metering mechanism and a drive for the take-up spool operated by the case drive for the purpose of metering accurate amounts of unexposed film after each exposure, and winding the exposed film on the take-up spool. The magazine also includes a film flattening device for drawing the film flat into the focal plane at the time of exposure, this device illustratively comprising a conventional so-called vacuum back, also automatically operated by the case drive. Then finally the case drive is connected to the shutter as noted above so as to trip the shutter at the proper time in the operative cycle, and thereafter reset it for the next exposure operation. Thus, a typical cycle of operation comprises tripping the shutter, metering unexposed film from the supply spool, and drawing the film flat into the focal plane prior to the next shutter tripping. In order that the film be perfectly flat in the focal plane at the time the shutter is tripped, I have provided means for delaying tripping operation of the shutter until the film drawing mechanism, i. e. the vacuum back, has completely flattened the film in the focal plane.

More specifically the shutter tripping operation is delayed by means of a relay so connected across the contacts of the electric motor in the case drive, and so connected to the source of current for the camera, that after the motor is deenergized at the end of the film advancing operation, the decaying counter-electromotive force bucks the energizing current to the relay, thereby delaying energization of the relay sufficiently long to keep it from closing the contacts in the circuit of a solenoid which, when energized, effects shutter tripping operation, this period of delay being of sufficient duration to enable the vacuum back to completely flatten the film in the focal plane.

In the drawing, wherein I have shown one form of my invention,

Figure 1 is a side view of the camera, certain portions being broken away, and others being shown in section;

Figure 2 is a fragmentary section taken along the line 2—2 of Figure 1;

Figure 3 is a wiring diagram of the control circuit for the camera; and,

Figure 4 is a plot of the voltage across the relay and camera motor against time.

Similar reference characters refer to similar parts throughout the views of the drawing.

As shown in Figure 1, the camera comprises a case drive, generally indicated at 10, to the top of which is detachably secured a film magazine 11, and to the bottom of which is attached a cone 12, the cone having detachably mounted therein a between-the-lens shutter, generally indicated at 13. The case drive 10, cone 12 and shutter 13 may, for purposes of illustration herein, be substantially as shown and described in detail in Fairchild 1,612,860, while magazine 11 may resemble that shown in Weiblen et al. 2,131,926.

More specifically, and as shown in Figure 2, the mechanism of case drive 10 is supported in a housing 14, on one side of which is supported a motor 15 (see Figure 1). This motor is connected by a drive shaft 16 (Figure 2) to a worm 17 which, by means of suitable gears and shafts (not shown), drives a shaft 18. Shaft 18 carries a gear 19 (Figure 1) which meshes with a gear 20 mounted on a stud 21 rotatably supported in a boss 22 formed in the top of the case drive housing 14. The upper end of stud 21 is provided with a coupling 23 which is detachably connectable with a similar coupling 24, this connection comprising the power connection between the case drive 10 and magazine 11, whereby the various mechanisms in the magazine are driven.

As the mechanism in magazine 11 is described in detail in the above-mentioned Patent 2,131,926, it will suffice to say here that a main input shaft 25 is connected to the film take-up spool driving mechanism generally indicated at 26, by which the exposed film is wound on the spool (not shown) under the control of a metering roller 27. Also driven by shaft 25 is a cam 28 which controls the operation of a lever 29 pivotally connected at its left-hand end to the top of a valve plunger 30. This plunger operates a valve 31 which forms a pneumatic connection between a pipe 32 and a vacuum back 33. Thus when pipe 32 is connected to any suitable evacuating device, such as a vacuum pump, such evacuating device may be pneumatically connected with vacuum back 33 upon manipulation of valve plunger 30 to evacuate the interior of the vacuum back so as to draw the film F flat against a perforated plate 34, which plate may form the focal plane of the camera lens.

In operation the film take-up spool mechanism 26 is driven by case drive 10, through shaft 25 to draw the proper amount of unexposed film F from supply spool S under plate 34, until a proper amount of film, as determined by metering roller 27, has been fed into position. At this point cam 28 rocks lever 29 to open valve 31, so that the interior of vacuum back 33 is evacuated and the film is drawn flat against perforated plate 34, the film thus being in proper condition for exposure.

As noted above, case drive 10 also includes mechanism for operating shutter 13. Thus referring back to Figure 2, the case drive includes a solenoid 35 whose plunger 36 is channeled as at 37 to receive a pin 38 carried by a latch 39 pivotally fastened to the case drive housing 14, as by a pin 40. This latch is provided with a hook 41 adapted to interengage with a mating hook 42 formed on a latch plate 43 also pivotally connected to case drive housing 14 as by a pin 44 fastened to plate 43. Pin 44 is accordingly pivotally mounted in housing 44 by latch plate 43. Latch plate 43 also includes an angularly extending arm 45 which carries a pin 46; this pin provides an anchor for one end of a spring 47, the other end of which is pinned to the case drive housing. Spring 47 accordingly constantly biases the latch plate counterclockwise against the holding action of latch hook 41. Thus it follows that upon energization of solenoid 35, and consequent retraction of its plunger 36, the right hand end of the plunger engages latch pin 38 to rock latch 39 counterclockwise, thus to disengage its hook 41 from latch plate hook 42. When these hooks are disengaged, spring 47 rocks latch plate 43 counterclockwise, also rocking pin 44 in the same direction, as the pin is secured to the latch plate.

This pin 44 extends downwardly through the bottom of case drive housing 14, the bottom end of the pin comprising the female portion of a separable coupling for a telescopic shaft 49. The lower end of this shaft is also separably connected to the shutter tripping mechanism (not shown) in shutter 13. For a detailed description of this mechanism, reference is made to Fairchild 1,626,032. Thus it may be seen that when latch plate 43 (Figure 2) is rocked in the manner described, this movement is imparted to the corresponding mechanism of the shutter, thus to trip the shutter.

Shaft 18 (Figure 2) of case drive 10 also carries a gear 50 which meshes with a gear 51 attached to a shaft 52 rotatably mounted in the bottom of the case drive housing. The lower end of shaft 52 is detachably connected to a telescopic shaft 53, the lower end of which is attached to the rewind mechanism 54 of shutter 13. For a detailed description of this rewind mechanism, reference is made to the above-noted Fairchild Patent 1,626,032. It might also be noted, with reference to the case drive, that latch plate 43 also cooperates with a pivoted dog and associated mechanism, generally indicated at 55, and described in detail in above-noted Patent 1,612,860, by which a clutch generally indicated at 56 is engaged when the latch plate is rocked, as described. Engagement of this clutch effects engagement between the motor and case drive shaft 18, so as to form a driving connection between the motor and magazine 11, and between the motor and the shutter mechanism described.

Also included within case drive housing 14 are switches 57 and 58, both of which are in the circuit of motor 15, switch 58 being in the nature of a starting switch, while switch 57 holds the motor circuit closed during the cycle of operation, all as will be described in detail hereinbelow. Switch 57 includes stationary and movable contacts 57a and 57b, the latter of which is engageable by a pivoted arm 59, the free end of which engages and follows the surface of a cam 60. Switch 58 includes stationary and movable arms 58a and 58b, the latter of which is engageable by a pin 61 carried by latch plate 43. It may now be seen that when the solenoid is energized to release the latch plate, as hereinbefore described, resulting counterclockwise movement of the latch plate causes pin 61 to engage switch arm 58b and force it into contact with the other switch arm 58a of switch 58, thus completing the circuit to the motor. At the same time, as described, the clutch 56 is engaged so that shaft 18 and accordingly cam 60, which is attached to the shaft, rotate. As the cam rotates, it forces arm 59 against movable contact 57b of switch 57 to move this contact into engagement with the other contact of the switch. It will now appear that through the provision of the two switches 57 and 58, switch 58 may be opened subsequent to the closing of switch 57 without, however, deenergizing the motor, this for a purpose which will appear hereinafter.

Referring now to Figure 3, it may be seen that one side of motor 15 is connected by lines 62 and 63 to one side of a source of current 64, the other side of the motor being connected to a line 65, this line also leading to stationary contact 58a of case drive switch 58. A line 66 connects line 65 to movable contact 57b of switch 57, the stationary contact 57a of which is connected by lines 67 and 68 to a line 69, in turn connected to the other side of source 64 through a main on and off switch 70. Line 67 is also connected by a line 71 to the stationary arm 58a of case drive switch 58.

A relay, generally indicated at 72, has its coil 73 connected across camera motor contacts 57a and 57b by leads 74 and 75, respectively. This relay includes a pair of contacts 76 and 77, the former of which is connected by a lead 78 to one side of solenoid 35. The other relay contact 77 is connected by a lead 79 to line 63, and accordingly to one side of source 64. The other side of solenoid 35 is connected by a lead 80 to a switch 81, the switch arm 82 of which is connected by a lead 83 to line 69 and accordingly to the other side of source 64 through switch 70.

From the above, it may be seen that the relay coil 73 is connected across the contacts of camera motor switch 57, while the relay contacts 76 and 77 are connected in series with the tripping solenoid 35. Hence when the camera is at rest, the switch 70 closed and switch 81 open, the shutter is ready to trip, and the motor contacts 57a and 57b are open. Under such circumstances, the resistance of relay coil 73 is high, while the resistance of the armature of motor 15 is low, a circuit being established between the positive and negative terminals of the power supply 64 through relay coil 73 so that a little current flows through the relay. The operating voltage of the relay is such that this current is sufficient to operate the relay, but is insufficient to affect the motor. Accordingly, the relay contacts 76 and 77 are closed, thus to complete the circuit through tripping solenoid 35. With the circuit in this condition, tripping switch 81 may be closed, thus establishing a circuit from one side of power supply 64 through lines 63 and 79, relay contacts 77 and 76, line 78, solenoid 35, line 80, switch arm 82, lines 83 and 69 and switch 70 to the other side of the power supply. When the solenoid is energized, latch plate 43 (Figure 2) is released, as hereinbefore described, and the shutter is tripped.

Upon release of the latch plate, it will be recalled that contacts 58a and 58b of switch 58 are engaged. Thus, referring back to Figure 3, relay 73 is shorted by reason of the establishment of a circuit including power supply 64, lines 63 and 62, motor 15, line 65, switch 58, lines 71, 68 and 69 and switch 70 to the other side of the power supply. With the relay thus shorted out, its contacts 76 and 77 open, thus deenergizing solenoid 35. Thus it follows that during run away operation of the camera, tripping solenoid 35 is not continuously energized, and therefore does not heat up.

Of course, when latch plate 43 is tripped, clutch 56 (Figure 2) is engaged, with the result that cam 60 starts to rotate. Shortly after it starts to rotate, motor contacts 57a and 57b are closed, thus completing the holding circuit for the motor. The shutter having been tripped, continued rotation of the motor advances the film and actuates the vacuum back, as hereinbefore described, thus to complete the cycle of operation. Of course, when cam 60 rotates to the position shown in Figure 3, the motor contacts reopen.

As may be seen in Figure 2, shaft 18 also carries a cam 84 which, as it rotates, engages a pin 85 carried by latch plate 43. Continued rotation of the cam finally rocks the latch plate clockwise, until its hook 42 reengages with hook 41 of latch 39 to prepare the latch for subsequent release upon reenergization of solenoid 35. During the resetting of the latch plate, the contacts ow switch 58, of course, open, and were it not for switch 57, the motor would stop before the end of the cycle of operation. Thus it may be seen that during one revolution of case drive shaft 18, which is initiated immediately upon the shutter's being tripped, the magazine mechanisms are driven, as hereinbefore described, i. e. the film is advanced by a metered amount subsequent to which the unexposed film is drawn flat into the focal plane upon actuation of the vacuum back. All other things being equal, and switch 81 (Figure 3) being closed, the shutter would again immediately trip, thus to initiate another cycle of operation when the camera is operated in run away fashion.

As pointed out hereinabove, however, there are circumstances wherein the period of vacuum back evacuation prior to retripping of the shutter is insufficient for the film to be drawn completely flat into the focal plane. It is toward the end of obviating this condition that relay 72 is provided. With reference to Figure 4, the voltages across the relay and motor are shown plotted against time. Thus the curve 86 is the supply voltage, while the curve 87 indicates the counter electromotive force generated by the motor, and the curve 88 indicates the voltage of relay 72. At time $t^0$, i. e. the time when motor contacts 57a and 57b (Figure 2) separate, the motor circuit is broken and the motor coasts. The counter electromotive force generated by the motor does not immediately drop to zero, but falls gradually, as indicated by portion 87a of curve 87. It accordingly follows that at time $t^0$ the relay voltage suddenly rises to a value equal to the difference between the generated and supply voltage, as indicated by portion 88a of curve 88, and slowly thereafter until the motor finally stops, at which time the relay voltage equals the full supply voltage. From a determination of the decay characteristics of the counter electromotive force generated by the motor, relay coil 73 is so chosen as to have an operating voltage indicated by the dotted line 89, which will provide the required time lag $t$. Thus the relay coil will not be sufficiently energized to cause its contacts 76 and 77 to reengage, thus to energize solenoid 35 to trip the shutter until its voltage builds up to its operating voltage. In other words, the decaying counter electromotive force of the coasting motor bucks the energizing voltage for the relay sufficiently to delay relay operation the desired amount of time.

While relay 72 may be a conventional relay, preferably it is of the type known as a time delay relay. Thus relay 72 also includes a core 90, having mounted on one end thereof a short bobbin (not shown) about which the turns of coil 73 are wound. On the other end of core 90 is a single turn coil 91 which may comprises a short length of round copper bar stock drilled with a hole of suitable size to permit mounting on the core. With such a relay there is considerable time delay between the instant voltages applied to the coil and the time the relay armature 92, which may be fastened to contact 77, actually performs its function of actuating the relay contacts. This delay is caused by the following effect: At the time voltage is applied to the relay coil, current flows through its many turns, which tends to produce a magnetic flux flowing longitudinally in the mild steel core 90. This flux links with the single turn of the copper ring 91, and as the flux builds up from zero to its final steady state value, it induces a current within the copper ring which happens to be in a direction opposite to the current in the main relay coil. This tends to buck the flux which is produced by the relay coil. The resultant effect is that the flux finally reaches the same value which it would if there were not present the copper ring 91 for the lag coil, but it takes a longer time for the flux to reach that value. Consequently it takes a longer time for the flux to reach any intermediate value which may be required to create sufficient force to actuate the relay armature and complete the relay function. With such a relay, the resulting delay between the deenergization of motor 15 and the time the contacts 76 and 77 are closed is a combination of the delay caused by the time required for the relay voltage to reach the value shown by the dotted line 89 in Figure 4, and the time required for the flux to build up to the relay operating flux, as described above.

Thus it may be seen that the several objects set forth hereinabove are accomplished in a thoroughly practical and efficient manner.

As many possible embodiments may be made of the above invention, and as many changes might be made in the embodiment above set forth, it is to be understood that all matter hereinbefore set forth or shown in the accompanying drawing is to be interpreted as illustrative and not in a limiting sense.

I claim:

1. In camera construction, in combination, a shutter, means for tripping said shutter, a film magazine having mechanism therein for advancing strip film, means in said camera forming a focal plane, vacuum means in said camera operable to draw the film flat into said focal plane, drive means including an electric motor for automatically effecting successive cycles of operation of the camera, each cycle comprising the successive operations of tripping the shutter, advancing the film and operating the vacuum means, a solenoid and contacts therefor, relay means energizable to close said contacts once per cycle to energize said solenoid, means forming an operative connection between said solenoid and said shutter tripping means, whereby the shutter is tripped when the solenoid is energized, and means electrically associated with said motor and said relay means for delaying operation of said relay means thereby to delay tripping of the shutter until said vacuum means has had sufficient time to draw the film flat into said focal plane.

2. In camera construction, in combination, a shutter, means for tripping said shutter, a film magazine having mechanism therein for advancing strip film, means in said camera forming a focal plane, vacuum means in said camera operable to draw the film flat into said focal plane, drive means including an electric motor for automatically effecting successive cycles of operation of the camera, each cycle comprising the successive operations of tripping the shutter, advancing the film and operating the vacuum means, said drive means including a solenoid and contacts therefor closable once per cycle to energize said solenoid, means forming an operative connection between said solenoid and said shutter tripping means, whereby the shutter is tripped when the solenoid is energized, means for closing said solenoid contacts, and means electrically connected to said motor and said solenoid contacts closing means for delaying operation of said solenoid contact closing means to delay closing of said solenoid contacts thereby to delay tripping of the shutter until said vacuum means has had sufficient time to draw the film flat into said focal plane.

3. In camera construction, in combination, a shutter, means for tripping said shutter, a film magazine having mechanism therein for advancing strip film, means in said camera forming a focal plane, vacuum means in said camera operable to draw the film flat into said focal plane, drive means for automatically effecting successive cycles of operation of the camera, each cycle comprising the successive operations of tripping the shutter, advancing the film and operating the vacuum means, said drive means including a solenoid and contacts therefor closable once per cycle to energize said solenoid, means forming an operative connection between said solenoid and said shutter tripping means, whereby the shutter is tripped when the solenoid is energized, relay means adapted upon energization to close said solenoid contacts, said drive means also including an electric motor energizable once per cycle for operating said drive means, and means forming an electrical connection between said motor and said relay means and operative upon deenergization of said motor for delaying closing of said solenoid contacts thereby to delay tripping of the shutter until said vacuum means has had sufficient time to draw the film flat into said focal plane, said electrical connection means being operative upon energization of said motor to deenergize said relay means to permit said solenoid contacts to open.

4. In camera construction, in combination, a shutter, a solenoid, means operated by the actuation of said solenoid to trip said shutter, a film magazine having mechanism therein for advancing strip film, means in said camera forming a focal plane, vacuum means in said camera operable to draw the film flat into said focal plane, drive means for automatically effecting successive cycles of operation of the camera, each cycle comprising the successive operations of tripping the shutter, advancing the film and operating the vacuum means, said drive means including an electric motor energizable once per cycle for operating said drive means, and relay means electrically associated with said motor and said solenoid for delaying the shutter tripping operation until said vacuum means has had sufficient time to draw the film flat against said focal plane means, said relay means including a member electrically connected to said motor and responsive to deenergization thereof.

5. In a camera construction of the character set forth in claim 4, said relay means also including a switch electrically connected to said solenoid and operative upon a predetermined degree of energization of said relay.

6. In camera construction, in combination, a shutter, means for tripping said shutter, a film magazine having mechanism therein for advancing strip film, means in said camera forming a focal plane, vacuum means in said camera operable to draw the film flat into said focal plane, drive means including a clutch for automatically effecting successive cycles of operation of the camera, each cycle comprising the successive operations of tripping the shutter, advancing the film and operating the vacuum means, a solenoid adapted upon energization to engage said clutch, a circuit for said solenoid energizable once per cycle to energize said solenoid, means forming an operative connection between said solenoid and said shutter tripping means, whereby the shutter is tripped when the solenoid is energized, said drive means including an electric motor energizable once per cycle for operating said drive means, a circuit including contacts and a source of current for said motor, a relay having its coil connected across said motor contacts and its contacts in said solenoid circuit, said coil being of sufficiently high resistance so that sufficient current flows to operate the relay but not enough to operate the motor when said motor contacts are open, said relay coil being shorted and therefore deenergized when said motor contacts are closed, thereby to deenergize said solenoid circuit, said relay being associated with said solenoid contacts to hold said contacts closed when the relay coil is energized thereby to effect energization of said solenoid, and means in said drive mechanism for opening said motor contacts at the end of the film advancing operation, thereby to deenergize said motor and energize said relay coil, whereby the decaying counter electromotive force generated by the coasting motor bucks the energizing current of the relay for a period of time to prevent immediate relay energization as would reenergize said solenoid circuit thus to delay the next shutter tripping operation until said vacuum means has had sufficient time to draw the film flat into said focal plane.

7. In camera construction, in combination, a shutter, a film magazine having mechanism therein for advancing strip film, means in said camera forming a focal plane, means in said camera operable to draw the film flat into said focal plane, drive means including an electric motor for automatically effecting successive cycles of operation of the camera, each cycle comprising the successive operations of tripping the shutter, advancing the film and operating the film drawing means, electromagnetic means, means operative once per cycle upon the actuation of said electromagnetic means for tripping said shutter, and means including a relay electrically connected to said motor for delaying energization of said energizable means thereby to delay tripping of the shutter until the film drawing means has had sufficient time to draw the film into said focal plane, wherein the relay means includes a coil and the electric motor is connected to a circuit having a pair of contacts therein, said coil being connected across said contacts whereby when the motor is deenergized and the relay is energized the electromotive force generated by the coasting motor bucks the energizing current of the relay.

IRVING W. DOYLE.

REFERENCES CITED

The following references are of record in the file of this patent:

UNITED STATES PATENTS

| Number | Name | Date |
| --- | --- | --- |
| 1,612,860 | Fairchild | Jan. 4, 1927 |
| 1,626,032 | Fairchild | Apr. 26, 1927 |
| 1,764,066 | Chamberlin | June 17, 1930 |
| 1,974,842 | Black | Sept. 25, 1934 |
| 2,116,314 | Jenkins et al. | May 3, 1938 |
| 2,131,926 | Weiblen et al. | Oct. 4, 1938 |